United States Patent [19]

Ramono

[11] Patent Number: 5,070,320

[45] Date of Patent: Dec. 3, 1991

[54] ALARM SYSTEM

[76] Inventor: Ralph Ramono, 1361 McCartney St., Pittsburgh, Pa. 15220

[21] Appl. No.: 365,138

[22] Filed: Jun. 12, 1989

[51] Int. Cl.[5] .......... G08B 1/08; H04Q 7/00

[52] U.S. Cl. .......... 340/539; 340/527; 340/531; 340/532

[58] Field of Search .......... 340/539, 527, 528, 531, 340/532

[56] References Cited

U.S. PATENT DOCUMENTS

| | | | |
|---|---|---|---|
| 3,833,895 | 9/1974 | Fect et al. | 340/539 |
| 3,864,674 | 2/1975 | Worsham et al. | 340/539 |
| 3,914,692 | 10/1975 | Seaborn, Jr. | 340/539 |
| 4,772,876 | 9/1988 | Lard | 340/539 |
| 4,853,692 | 8/1989 | Wolk et al. | 340/539 |
| 4,855,713 | 8/1989 | Brunius | 340/539 |
| 4,947,152 | 8/1990 | Hodges | 340/573 |

*Primary Examiner*—Donnie L. Crosland

[57] ABSTRACT

An alarm system for generating an alarm from a remote location and which utilizes electrically generated codes to access selected functional portions of the alarm system circuitry and which further utilizes a locking transmitter which must be reset after a single use thereof before the transmitter may be re-used, the transmitter resetting being achieved by means accessible only to authorized personnel.

7 Claims, 6 Drawing Sheets

ALARM SYSTEM

BACKGROUND OF THE INVENTION

The present invention relates generally to a security alarm system which detects a distress signal or the like transmitted from a remote transmitter to one or more intermediate monitoring stations, and optionally to a central dispatch station thus bringing prompt response as indicated immediately to the site of the distress signal to deal with the problem at hand.

The prior art of alarm systems is replete with alarm signal generators and receivers which are intended to be effective as warning devices for any sort of emergency situation requiring prompt response from public safety or security authorities such as the police, fire department, emergency medical system personnel, or the like. Any sort of event calling for prompt response from these or other public safety and security personnel requires, upon its occurrence, immediate communication of a distress or emergency alarm to a central dispatcher with indication of the location of the emergency event to be dealt with. Such emergencies might include, but are not limited to, any medical emergency of any cause whatever, street crime such as assaults or muggings, other unauthorized intrusions upon one's person or property such as break-ins or auto theft, and especially emergencies in the home such as fire, domestic violence, the like.

Examples of security alarm systems from the prior art include U.S. Pat. No. 4,241,332 which discloses a combined portable visual and audible alarm which requires actuation of a key lock switch to deactivate the same. U.S. Pat. No. 3,891,986 discloses a warning system which provides for common operation of a motor vehicle horn and light signal. U.S. Pat. No. 2,101,209 discloses a conventional "fire box" type alarm system for signaling a central dispatcher. U.S. Pat. No. 2,213,100 discloses a residential or similar warning system in which an actuating signal provides a visual warning by reversing the on/off state of conventional lighting with those lights that are on being turned off or dimmed and those lights that are off being turned on by the actuating signal.

U.S. Pat. No. 2,206,556 discloses a railway signaling system. U.S. Pat. No. 2,942,249 discloses a conventional wired system for remote to central station signaling. U.S. Pat. No. 2,663,864 discloses a burglar alarm system having plurality of establishments which are potential burglary targets connected in a common alarm system such that, when the system is actuated in one of the establishments, the warning alarm is actuated in all the establishments except the one where the actuation signal originated. U.S. Pat. No. 4,764,757 discloses a security system which contemplates a plurality of independent local alarms spaced from one another and actuatable by portable transmitters within the receiving range of individual ones of the independent vocal alarms. Upon actuation by a transmitter, the independent local alarm receiving the transmission provides a local alarm and in addition provides to a central response or control unit a signal which is unique to the independent local alarm sending it.

BRIEF SUMMARY OF THE INVENTION

My invention contemplates an improved emergency or distress signaling system which provides for wireless communication of distress signals from a readily accessible and preferably portable transmitter to one or more intermediate alarm signal receivers and retransmitters which receive and retransmit the alarm signals in sequence. Some of the intermediate signal receivers/-transmitters also provide local alarm signals to identify the problem area for security personnel responding to the distress signal.

In addition, my invention contemplates the use of coded radio frequency signals, such as conventionally used in residential garage door openers for example, to thwart improper use of the portable distress signal transmitters, to identify and locate the site or source of the distress signal, to control activation/deactivation of a distress alarm in a moving vehicle, and for other purposes to be described. Still further, my invention contemplates a locking switch mechanism for a transmitter which renders the transmitter inoperable after a selected number of uses (e.g. one use thereof) until it is reset by authorized security personnel.

With the security alarm system as set forth hereinbelow, highly reliable security for individuals, their homes and their automobiles can be readily achieved. Response effectiveness of emergency personnel also can be greatly enhanced. In addition, unauthorized use of the system such as by a housebreaker to thwart operation thereof by setting off decoy emergency signals in areas other than the area targeted by the housebreaker, or use by pranksters or other misanthropic sorts, is effectively deterred.

It is therefore one object of the present invention to provide a novel and improved security alarm system wherein coded signals transmitted from a transmitting unit are utilized to provide differing functional operations in a receiving unit.

A further object of the invention is to provide a security alarm system with a locking alarm signal transmitter that renders the transmitter inoperable after a single use thereof until reset by authorized personnel.

These and other objects and further advantages of the invention are more fully described in the following detailed description in the accompanying drawings, in which.

A security and personal protection system for use both inside and outside dwellings or other facilities is described herein. In its preferred form, this system is primarily a radio controlled system which allows a person to signal an alarm from a variety of locations in the home or from a remote location. The alarm will alert others in the immediate vicinity to the existence of a problem, thus assisting them or security personnel in quickly finding the location of the problem. The system includes built-in protection against misuse, interdiction by unauthorized users, and false alarms caused by spurious radio transmissions.

Figure 1:
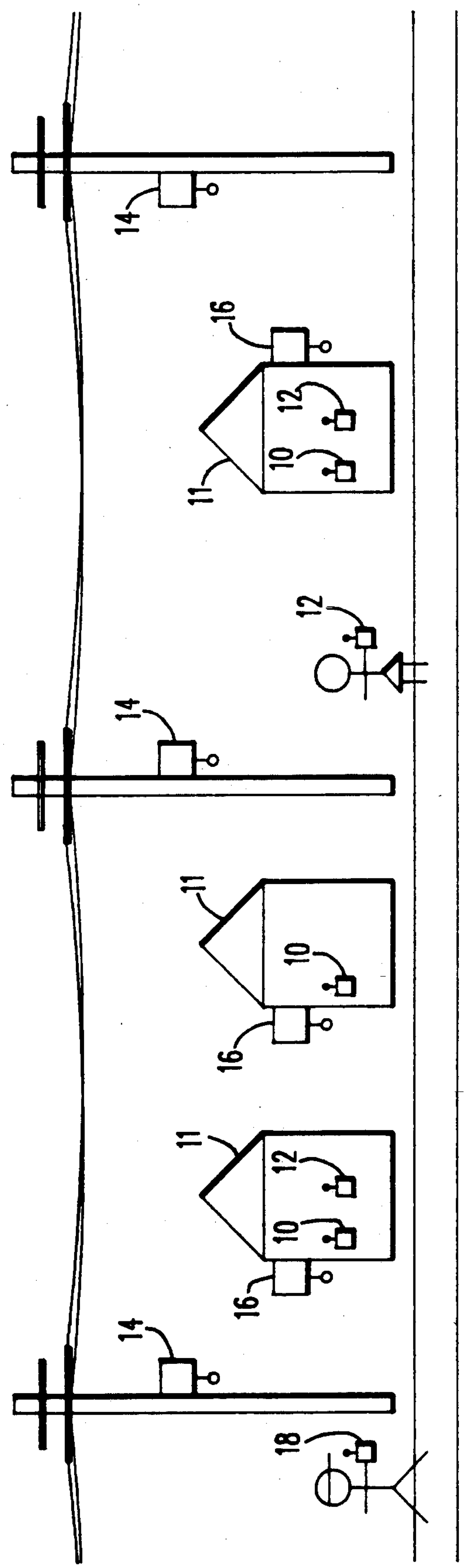
FIG. 1 is a generally schematic illustration of a security alarm system according to one presently preferred embodiment of the instant invention.

Referring to FIG. 1, a local alarm initiator 10 is intended to be used in a fixed location such as in a dwelling or other enclosed facility 11. Preferably, initiator 10 is a small battery powered, hand-held or wall mounted radio transmitter that will transmit an individually assigned coded signal on an assigned frequency when actuated. It may be actuated by a push button, for example, to cause the signal transmission to occur. Alternative actuators may include low power switches such as on a matrix switch panel, magnetically operated reed switches on windows or doors, break-in frequency detectors, infrared motion sensing devices or the like, to offer the protection desired by the occupants of the dwelling.

Thus, an initiator 10 may be installed with a number of actuators just as in conventional home security systems. Alternatively, a number of individual initiators 10 may be installed, one for each desired actuator.

A portable remote alarm initiator unit 12 is operable outside the dwelling or facility 11, such as by a person walking along a street, visiting in the neighborhood, engaging in yard work or gardening, and the like. Remote initiator 12 preferably is a small, battery powered, hand-held radio transmitter and receiver unit that transmits and receives signals on assigned frequencies. Each remote initiator 12 is individually set to transmit and receive assigned codes. It offers protection for individuals while outside the dwelling or facility 11 by permitting transmission of an alarm code for a pre-set time period directly to a fixed area alarm 14.

Remote initiator 12 also incorporates a radio receiver that is utilized for several purposes, one of which is to allow the initiator 12 to receive a re-set code from resetting equipment accessible only to security personnel. Another purpose of the receiver in the initiator 12 is to allow it to receive an identification code from any fixed area alarm 14, which thus allows the initiator 12 to reset its transmission code to match the individual receive code of the particular fixed area alarm 14. The remote initiator 12 thus can transmit an alarm signal that is compatible with the respective fixed area alarm 14.

Persons responding to a distress signal from an actuated fixed area alarm 14 will know immediately the approximate whereabouts of the individual who has initiated the alarm from a remote initiator 12 as that person must be within transmission range of the actuated fixed area alarm 14.

The remote alarm initiator 12 also incorporates a locking actuator, for example in the form of a locking push button actuator that is operative when actuated to lock so that the initiator 12 cannot be subsequently used to initiate a further alarm until the lock is released by security personnel. This locking feature prevents misuse of the initiator 12, as for example in triggering a number of fixed area alarms by a prankster or a house breaker seeking to create decoy signals.

A fixed facility alarm retransmitter 16 is operative to receive alarm transmissions from the initiator 10, and to retransmit these alarm transmissions to be received by the nearest fixed area alarm 14. Retransmitter 16 also locally annunciates the receipt of an alarm signal from initiator 10 with a light and an audible alarm. The retransmitter 16 is mounted on dwelling or facility 11, preferably externally thereof, and includes a radio receiver and a transmitter unit to accept a coded signal from the initiator 10 such that an alarm such as a red light or an audible alarm is initiated only when a properly coded signal is received thereby.

The fixed area alarm 14 is similarly operable to provide local audible and visual alarms whenever an alarm code is received thereby, thus to alert persons in the area to the problem and to guide them to the problem area. Fixed area alarm 14 may be mounted to existing utility poles or other elevated structures. Each fixed area alarm 14 is comprised of a radio receiver and a transmitter unit to receive alarm codes from initiators 12 or facility alarm retransmitters 16 and, if the signal is from one of initiators 12, to provide a return signal incorporating a unique input code to the actuated initiator 12 for identification purposes.

A mobile security controller 18 is used by authorized security or maintenance personnel to provide, among other functions, unlocking transmission signals for initiators 12, testing of units 14 and 16, and a means of interrogation and testing of the security system generally. Mobile security controller 18 includes a radio receiver and transmitter unit which is operable to provide multiple coded frequency transmissions as may be required in the area of operation to carry out the desired unlocking, testing, interrogation and maintenance functions.

Figure 2:
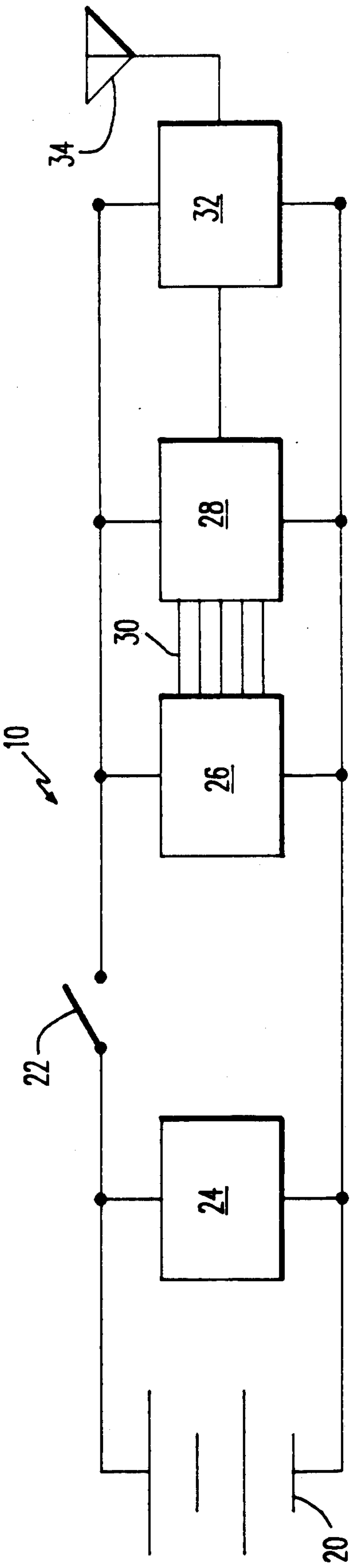
FIG. 2 is a schematic block diagram of an alarm signal transmitter for the system of FIG. 1.

Referring to FIG. 2, the local alarm initiator 10 preferably is a small, hand-held or wall mounted and battery powered unit used for initiation of an alarm. It is comprised of a long shelf life battery 20 which supplies power to the alarm transmitter circuitry of the initiator 10 when connected thereto by normally open switch contacts 22. A low battery detector circuit 24 is coupled between the positive and negative poles of battery 20 to detect battery condition and exhibit a local alarm, a chirp signal and/or a small LED indicator for example, upon detection of a low battery charge condition.

A code select module 26 is connected across the poles of battery 20 and is operative to allow transmission codes to be preset in the initiator 10. The large number of codes that can be made available allows each initiator 10 to have an individual code, thus identifying it to the receiver units. Code select module 26 preferably is configured such that it can be preset only by authorized factory or maintenance personnel, and a distinctive code is thus assigned and recorded for each initiator 10 placed in service.

Also connected across the poles of battery 20 is an encoding module 28 which accepts the code selection of the code select module 26 via connections 30. Encoding module 28 transmits a coded signal to a transmitter 32 at a predetermined timing and sequence. The transmitter 32 modulates the coded signal received from encoding module 28, converting it to a radio transmission signal which emanates from an antenna 34. Transmitter 32 is a low power unit suitable for transmission within a dwelling or facility 11.

Figure 3:
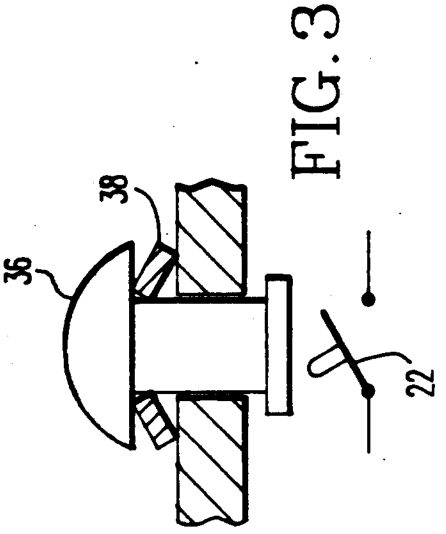
FIG. 3 is a sectioned side elevational view of a push button actuator switch for the transmitter of FIG. 2.

Various means of actuation of initiator 10 are contemplated. For example, FIG. 3 shows a simple push button 36 which directly operates switch contacts 22. A return spring 38 returns push button 36 to its unactuated position upon release thereof. As an alternative, a combination of two push buttons with corresponding switches could be arranged with the switch contacts in a series connection. Both push buttons would have to be depressed to complete the circuit to the transmission elements. This would provide added assurance that a false alarm is not generated by mishandling or improper storage of the initiator 10.

Figure 4:
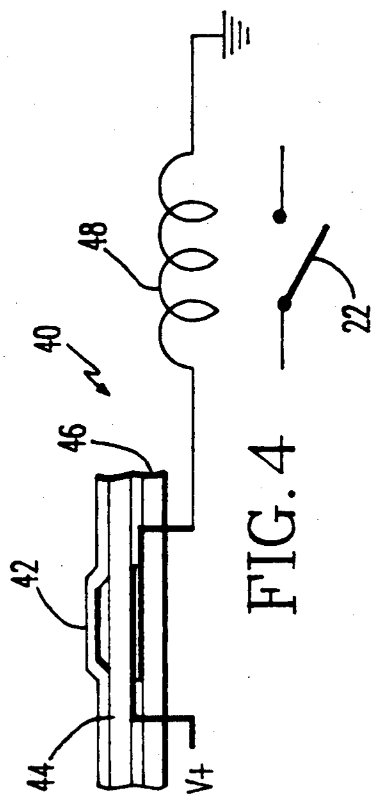
FIG. 4 is a schematic illustration of an alternative push button actuator switch for the transmitter of FIG. 2.

FIG. 4 shows another actuator for initiator 10 as a low power switch device 40 such a conventional matrix switch unit in which a relay operates the power switching. The switch unit 40 is shown as a laminate of four layers comprised of a formed cover having a dome 42, a layer 44 containing a deposited or etched electrical wiring trace and contact material, an insulating layer and a second layer 46 containing a deposited or etched wiring trace and contact material. This switch structure is connected to an associated relay coil 48 which, when energized, closes the normally open switch contacts 22. More specifically, the conductive trace in layer 44 is connected to battery 20 and the conductive trace in layer 46 is connected to relay coil 48. When the dome of cover 42 is depressed, it depresses the contact materials of layers 44 and 46 together thus completing the circuit and energizing relay coil 48 to close contacts 22 and cause the initiator 10 to transmit the coded signal.

Other means of actuation of the switch 22 can be utilized to provide other modes of protection for property and personnel. For example, magnetically operated reed switches used for door and window protection, temperature detectors, infrared motion detectors, as well as other similar devices may be used to actuate the initiator 10.

Remote alarm initiator 12 is a portable, preferably hand-held transmitter/receive. The operation of remote initiator 12 is such that when activated the switch actuator used to activate the initiator 12 is locked in an actuated state. The remote initiator 12 thus will initially transmit a coded radio signal to a nearby fixed area alarm 14 for a short, predetermined period of time. The receiver section of the initiator 12 will then listen for a response from the fixed area alarm 14, and if received, will alter its transmitted code to be suitable for the specific fixed area alarm unit 14 from which the response is received. Initiator 12 then retransmits the altered alarm code for another short, predetermined period of time. Once actuated, initiator 12 will continue to receive signals until a properly coded signal is received to unlock the actuating switch 50 and reset the initiator 12.

Figure 5:
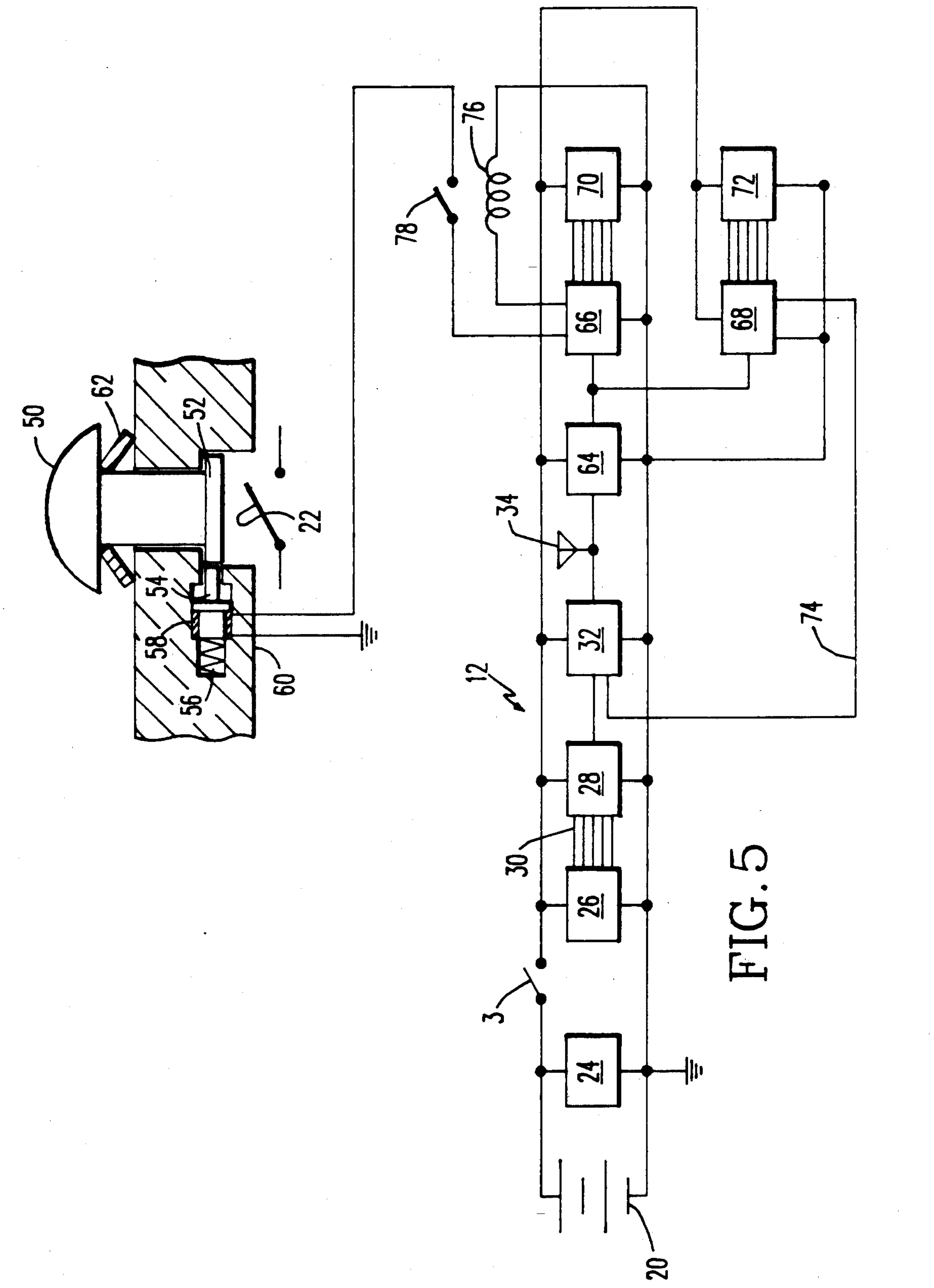
FIG. 5 is a generally schematic illustration of another alarm signal transmitter for the alarm system of FIG. 1.

Referring to FIG. 5, remote alarm initiator 12 has a transmitter section, similar to that described for the local alarm initiator 10 and comprised of a long shelf life battery 20, a low battery level detector and annunciator circuit 24, normally open switch contacts 22 which when closed supply power to the remaining components of the unit, a code select module 26, an encoding module 28 connected to code select module 26 by connections 30, and a transmitter 32 for transmitting a modulated encoded signal via an antenna 34. These components of remote initiator 12 function essentially as above described with reference to the corresponding components of initiator 10.

The remainder of the transmitting section of initiator 12 differs from the local alarm initiator 10 in that the actuation of the switch contacts 22 is achieved by a locking push button 50 or other locking switch structure so that when the push button is depressed it locks into the depressed position, keeping switch contacts 22 closed until they are reset by unlocking of the actuator. This locking action may be incorporated, for example, by a spring loaded plunger 54 that will engage a lip or flange of the depressed push button 50 to hold it in the actuated position. More specifically, when the push button 50 is depressed and a bottom lip 52 of the push button shaft moves past the end of axially movable plunger 54, a spring 56 forces plunger 54 to extend and lock over the edge of the lip 52. Unlocking is achieved by providing power to a solenoid coil 58 which will pull plunger 54 into the coil housing 60 and disengage the plunger 54 from the locking lip 52 of push button 50. Push button 50 is then reset by the action of a return spring 62.

The transmitter portion of initiator 12 also differs from the local alarm initiator 10 in that, when activated, encoding module 28 will signal transmitter 32 to send a single coded transmission, then pause to listen for a received signal. The initiator 12 can be set to repeatedly send the single coded transmission, once in each of a succession of predetermined time periods, until the initiator 12 is reset by unlocking pushbutton 50 or the battery 20 is exhausted.

Initiator 12 also includes a receiver section which is comprised of the shared antenna 34, a receiver/-demodulator 64, two decoding modules 66 and 68, and two code select modules 70 and 72. One decoding network comprised of decoding module 66 and code select module 70 will, when it receives a valid coded reset signal from receiver/demodulator 64, unlock push button switch 50 by energizing a relay coil 76 to close switch contacts 78 and thereby supply power to coil 58 in the switch lock mechanism. Coil 58 retracts plunger 54 against the bias of spring 56.

The other decoding network comprised of decoding module 68 and code select module 72 will, when it receives a valid coded signal from receiver/demodulator 64, interpret a new coded signal requirement as indicated thereby, and supply an encoded signal via connection 74 to transmitter 32 for retransmission of the new coded signal for purposes as set forth hereinbelow.

The fixed facility alarm retransmitter 16 is mounted preferably in a sealed enclosure protected against the elements and unauthorized intrusion, and is located on the outside of dwelling or facility 11. It is comprised of a power supply, a radio receiver and radio transmitter, decoding and encoding units, an alarm (e.g. an audible alarm), or a light, circuitry to latch on the alarm and light until reset, and interrogation circuitry to allow outside units to interrogate its alarm code.

Figure 6:
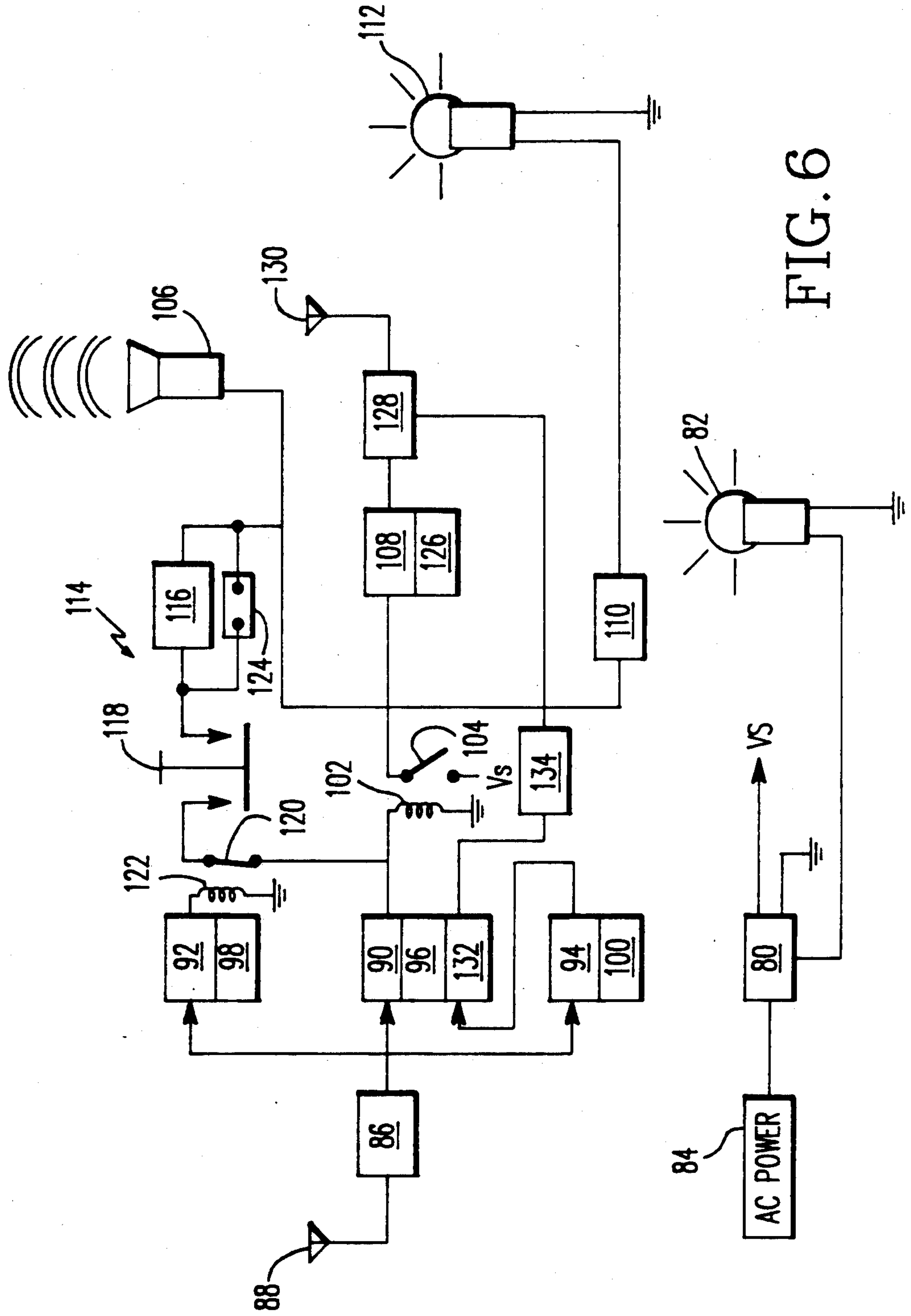
FIG. 6 is a generally schematic illustration of an intermediate receiver/retransmitter for the system of FIG. 1.

More specifically, as shown in FIG. 6, an uninterruptable power supply 80 provides battery power to facility retransmitter 16. Power supply 80 includes a ready circuit which detects the proper operation and supplies power to an externally visible light 82 such that observation of light 82 will be a valid check of power supply operation. Power is supplied to power supply 80 from the AC power source 84 of facility 11 to recharge its batteries; however, power supply 80 has the capacity to operate the facility retransmitter 16 for several days without external power.

A radio receiver 86 receives signals on a prescribed frequency from an antenna 88 and demodulates the signals suitable for use by decoding modules 90, 92 and 94. These decoding modules use respective associated presettable code select modules 96, 98 and 100 to respond only to the proper code for their individual functions.

Decoding module 90 is the primary reception decoder. It is preset to respond only to a specific code, as set by its associated code select module 96. When it receives the proper coded signal from receiver 86, it will energize a relay coil 102 which will then close normally open switch contacts 104. Contacts 104 supply power to an audible alarm 106, an encoder unit 108, a latching unit 110 and a light 112.

The latching unit 110 will latch up upon the receipt of power, thus continuing to illuminate light 112 to thereby indicate receipt of an alarm by facility retransmitter 16. Encoder unit 108 will, when energized, send a proper coded signal established by an associated code select module 126 to transmitter 128. Transmitter 128 will transmit a radio signal to the fixed area alarm 14 via an antenna 130. The code select module 126 thus is set to the correct code for the closest fixed area alarm 14. The above described functions of light 112 and transmitter 128 continue so long as contacts 104 are closed. In addition, when contacts 104 are closed, alarm 106 is energized to emit an audible alarm.

A latching circuit 114 is provided in facility retransmitter 16 to keep relay coil 102 energized for a predetermined period of time. This time period is controlled by a time out module 116 which, after a preset time, will cease to supply power from closed contacts 104 through switch 118 and normally closed contacts 120 to relay coil 102. Switch 118 is a normally closed manual switch. When opened by a maintenance person, it will open the latching power feed to relay coil 102 thus opening contacts 104 in turn and discontinuing power feed to audible alarm 106 and the remaining connecting elements as above described.

Decoder module 92 also receives a demodulated signal from receiver 86 which, if the signal agrees with the preset code of the code select module 98 associated with decoder module 92, will energize a relay coil 122 to open contacts 120 and thereby unlatch relay 102 to de-power the associated circuitry. Thus, contacts 104 may be opened by either remote or manual means.

A jumper 124 is provided in parallel with time out module 116 to allow installation personnel to select whether the time out module 116 will be used in the system, or whether the system will instead be set up to continuously sound an alarm until it is reset manually via switch 118 or by a suitable reset signal processed by decoding module 92 and fed to relay 122.

Decoder 94, when it receives a coded signal which agrees with the setting of the associated code select module 100, will cause an encoder unit 132 to determine the alarm code set in code select module 96, and to transmit a signal through a time out module 134 to transmitter 128. Time out module 134 continues feeding the signal from encoder unit 132 to transmitter 128 for a short, preset period of time. Therefore, the reception of a suitably coded query signal to the facility retransmitter 16 can be used to cause the unit to transmit a response such as one identifying its alarm code, without initiating any other function thereof. This will allow maintenance testing of the facility retransmitter 16 from the ground without setting off any alarms, and will also allow other uses such as two way communication between units as may be desired.

The fixed area alarm 14 (FIG. 7) is similar in structure and function to fixed facility alarm retransmitter 16, and in fact the two units could be identical in many respects. Accordingly, extensive repetition of the description here of those elements and functions of the fixed area alarm 14 which are identical to those of the facility retransmitter 16 as above described is believed unnecessary.

In addition to the structure and function of the fixed area alarm 14 as described hereinabove, each fixed area alarm 14 receives alarm signals from both those fixed facility alarm retransmitters 16 which have their encoders 108 preset to the proper code for a particular fixed area alarm 14, and in addition from any remote alarm initiator 12. Thus, to actuate a given fixed area alarm 14 the alarm signal from a fixed facility alarm retransmitter 16 must be coded to the same alarm code as established by the code select module 96 of the given fixed area alarm 14. When an alarm is generated, the fixed area alarm 14 will carry out its function to provide fixed area alarm annunciation by providing an audible alarm, a latched-on alarm light, and the choice of automatic, manual or radio reset as above described for the facility retransmitters 16.

The alarm signal from a remote alarm initiator 12 typically may not be in the proper alarm code to actuate a fixed area alarm 14, and a series of transmissions and receptions thus will occur to assure a valid alarm code signal as follows. When a coded signal is received from a remote alarm initiator 12 by a fixed area alarm 14, the signal will be interpreted by the decoder module 94 of the fixed area alarm 14, which is preset by the code select module 100. Decoder module 94 will then activate the encoder module 132 which reads the alarm code set in code select module 96. The encoder module 132 then transmits the alarm code of code select module 96 through time out module 134 to transmitter 128 for transmission via antenna 130. The remote alarm initiator 12 will receive this transmitted signal and will then determine and retransmit the proper alarm code to actuate decoding module 90 of the fixed area alarm 14 via operation of code select module 72 and decoding module 68 of the remote initiator 12 as above described. Actuation of decoding module 90 in the fixed area alarm 14 closes contacts 104 as above described thus actuating in unison audible alarm 106, visual alarm 112 and radio transmission from transmitter 128, which is monitored by a central dispatcher or similar entity with access to emergency facilities. Of course, the same occurs upon actuation of a fixed area alarm 14 by a facility alarm 16. The above described retransmission feature may also be used by security or maintenance personnel to check for proper operation of the system.

The mobile security controller 18 is a portable, preferably hand-held unit that is used for a multiplicity of tasks. The circuitry contained therein is a combination of that previously described or otherwise commercially available instruments and further detailed description thereof thus is not believed necessary.

The remote security controller 18 can be programmed to receive or transmit any code available on the various system components as above described, with push buttons or other suitable controls programmed for a multiplicity of fixed transmit and receive testing functions. The mobile controller 18 can also detect signal strength from other system components having transmitters to thereby detect the need for maintenance or calibration of such transmitter units. The mobile controller 18 functions as the primary means for security and maintenance checks of the system.

From the above description, operation of the system may be readily understood. Alarm initiators 10 are coded to initiate a response upon actuation thereof in respective fixed facility retransmitters 16. Because initiators 10 are coded, only the corresponding fixed facility retransmitter 16 mounted on the same building will respond to a signal from the initiator 10 assigned to that building. Thus, with initiator 10 the user is able to provide a visual and/or audible alarm at the building as well as retransmission of an alarm signal to the proper fixed area alarm 14. Because retransmitters 16 are coded to actuate only a specific fixed area alarm 14, they will not actuate more than one alarm 14 in the same way that initiators 10 will not actuate more than one facility alarm 16. Accordingly, both area identification and building identification are established by actuation of the initiator 10.

The audible/visual alarms provided by facility alarms 16 and area alarms 14 attract the immediate attention of people already in the vicinity. Thus, to the extent it may be available, immediate assistance is attracted to the person who has initiated the alarm.

Optionally, the fixed area alarm 14 may also retransmit the alarm signal to a central dispatch point, to identify the fixed area alarm from which the signal comes, so that security personnel will have immediate indication of the problem and the area where the problem exists. Like others already in the area, they will also have immediate verification upon approching the area in question, and audible/visual alarm on the building where a problem exists to guide them to the location of the problem.

The initiators 12, being portable, are coded to actuate any nearby fixed area alarm 14 in a manner that the initiator 12 can read a signal transmitted from any fixed area alarm 14 and then retransmit the proper coded signal to initiate an alarm by the same fixed area alarm 14. Accordingly, the initiators 12 will not set off nearby fixed facility alarms 16.

The alarm system as above described can be supplemented to provide additional protection against crimes using vehicles or the theft of vehicles. In the modified system, the fixed area alarm unit is modified and a vehicle alarm unit is added to provide increased system capability and protection. The fixed area alarm unit, as described, has added logic and coding circuitry which is operative when it received an alarm signal from a remote alarm initiator unit to transmit another preset coded signal for a period of time. This signal will be received and decoded by a vehicle alarm unit which will then sound an audible alarm and/or flash the vehicle lights, or provide other visual alarm.

This modified system could be used in the event of a witnessed kidnapping, mugging or vehicle theft, such that the witness could initiate an alarm through a nearby fixed area alarm unit and could also cause the vehicle alarm unit to alert area personnel, police and security personnel to the problem.

Figure 7:
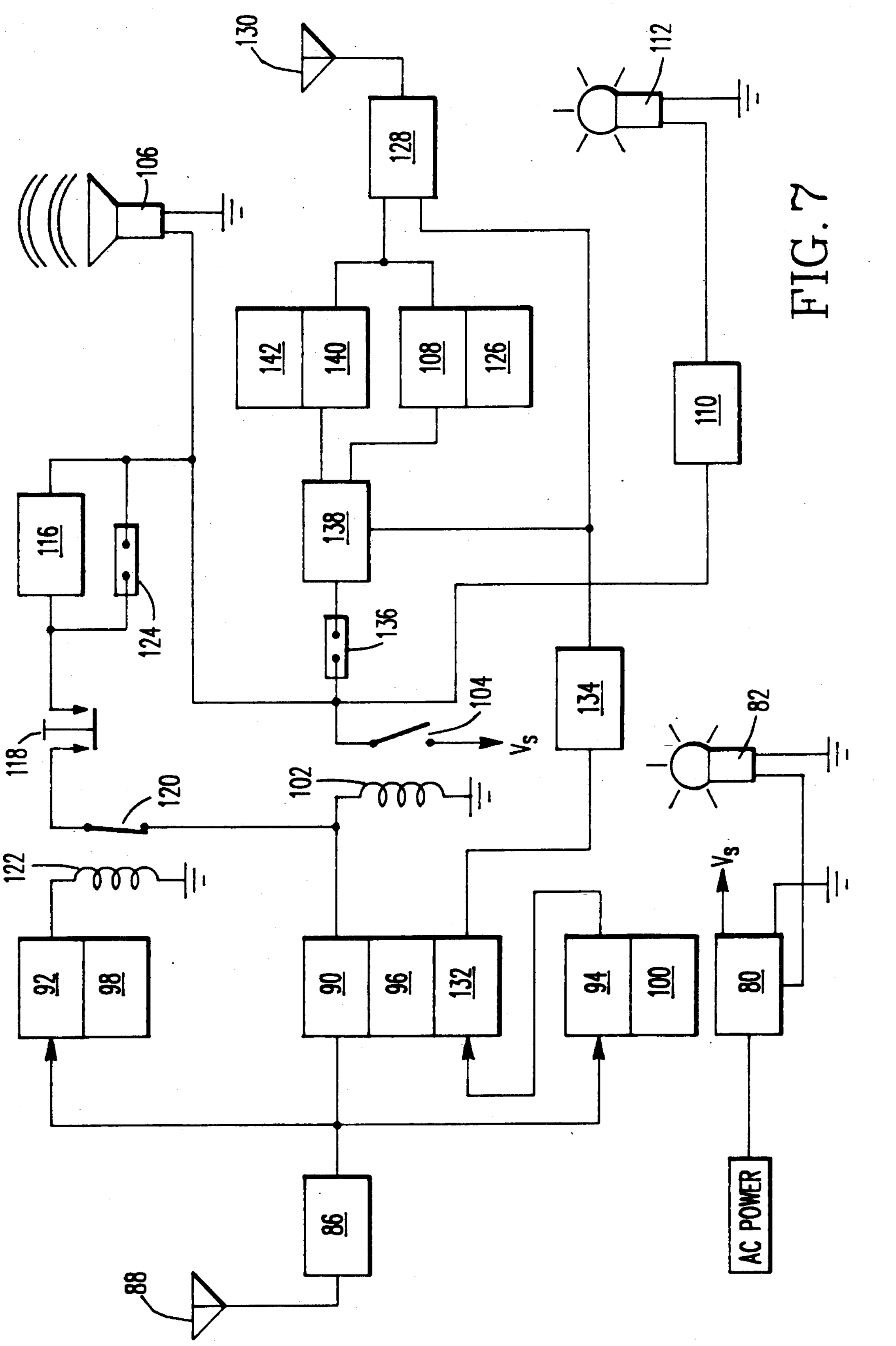
FIG. 7 is a generally schematic illustration of an alternative receiver/retransmitter for the system of FIG. 1.

More specifically, the modified fixed area alarm (FIG. 7) is mounted in a sealed enclosure and protected against the elements and unauthorized intrusion, and is mounted on a power pole or other common location serving several dwellings or protected facilities. It is comprised of a power supply, a radio receiver and transmitter, several decoding and encoding units, an audible alarm, an alarm light, and circuitry to latch on the alarm and light until reset. Many salient features of the modified fixed area alarm shown in FIG. 7 are identical to corresponding features of the fixed area alarm described hereinabove with reference to FIG. 6. Accordingly, in FIGS. 6 and 7 like elements have been assigned like identifying numerals. Reference is made hereby to the above description of FIG. 6 for description of all like numbered elements of FIG. 7 as it is not believed necessary to repeat such description here.

If a fixed area alarm unit 14 receives a signal from a remote alarm initiator 12, and shortly thereafter receives a properly coded alarm signal from the same, it can be operative to transmit a signal that will be received by a vehicle alarm system.

The fixed area alarm of FIG. 7 includes a jumper 136 by which the vehicle alarm feature is activated. When the modified fixed area alarm unit receives a signal from a remote alarm initiator 12, timer 134 will cause a limited duration retransmission of a signal back to the remote alarm initiator for code identification as above described. However, the code identification signal is also fed to a logic/timer module 138. If a valid alarm code is received from the remote initiator 12 immediately after this code identification check, the logic/timer 138 will cause encoder 108 to encode a signal from code selection module 126, which signal is then fed to transmitter 128 for transmission of the preset code via antenna 130. This transmission will consist of short time duration coded bursts every few seconds, which are transmitted to any auto alarm system in the reception area while still allowing other fixed alarm systems to sense additional alarm initiations. The burst and wait signal sequence will prevent potential saturation of the radio transmission band in the area, thus allowing continued additional protection. The logic/timer 138 will continue the transmission sequence as described for a period of time, for example 15 minutes, and then will discontinue feed of the signal to encoder 108, and will signal the encoder 140 to read the preset code switch module 142 and feed a short time duration coded reset signal to transmitter 128. The transmission of this coded signal will signal the auto alarms within reception range to reset as described hereinbelow.

If the vehicle of interest has left the area, as is likely if it has been used in the commission of a crime, it will be out of range of the reset signal and will thus continue to alert security personnel and police to itself by the horn and/or flashing lights. Therefore, during the 15 minute period of the alarm, a vehicle cannot be operated in the area that has such a protective device. Even if a criminal or thief waited out the 15 minute alarm period, the alarm could be reinitiated, effectively trapping the vehicle in the protected area until security forces or police arrive.

It is to be noted that the portions of the fixed area alarm unit shown in FIG. 7 which are utilized to initiate a vehicle alarm, including encoder 108, code select module 126, transmitter 128, and antenna 130, may be duplicates of similar elements in the area alarm unit of FIG. 6 which are used to transmit an alarm to a dispatcher or other central authority. Among the collection of all authorized remote initiators 12 can be remote initiators keyed to specific automobiles so that upon initiation of an alarm from an automobile-keyed remote initiator, the nearby fixed area alarm not only retransmits its code and then listens for a properly coded alarm signal from the remote initiator, it also reads the initial actuating signal from the remote initiator and in response generates a corresponding coded signal which will actuate only the alarm of the corresponding vehicle, if and when the properly coded actuation signal is received from the remote initiator.

Figure 8:
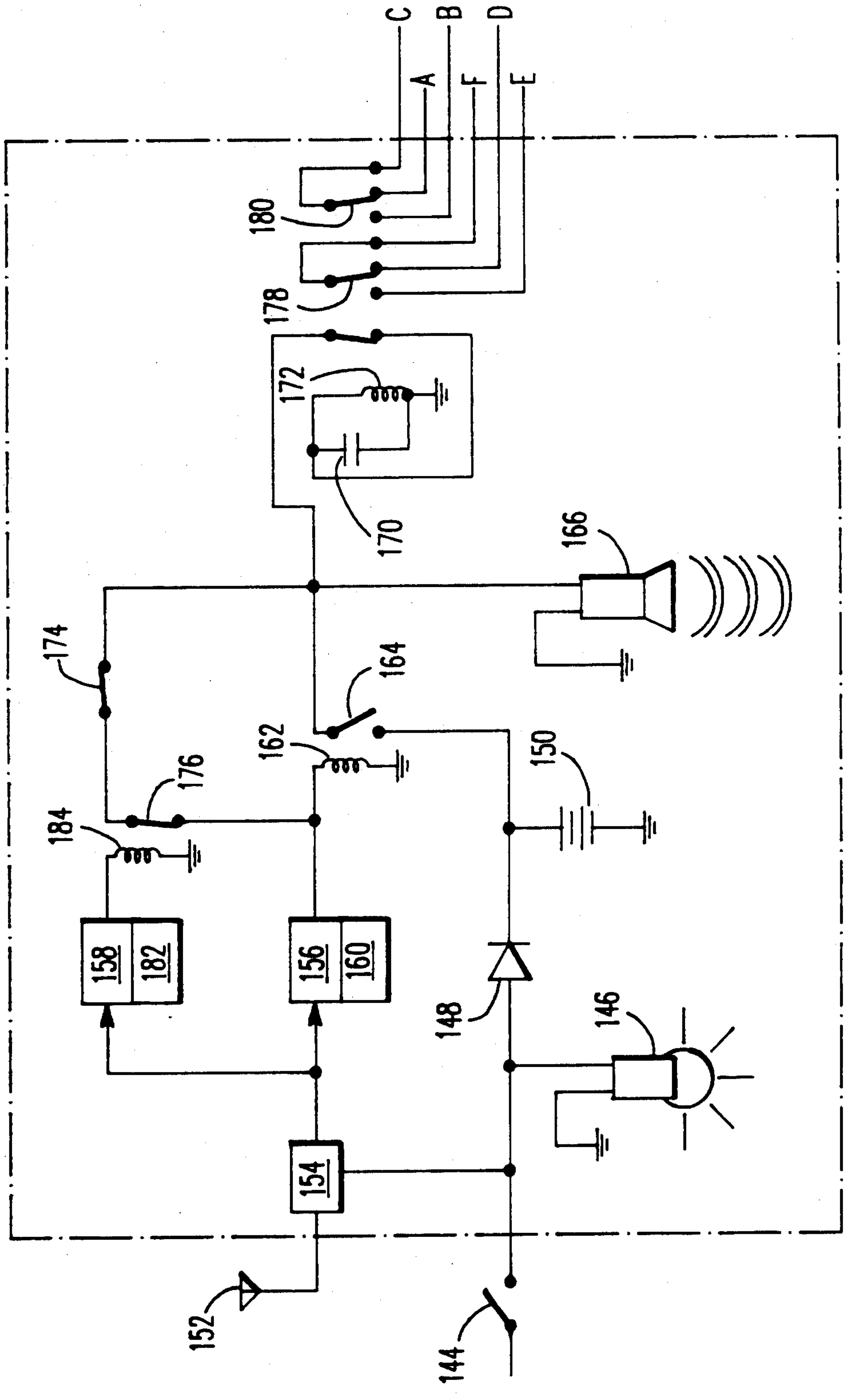
FIG. 8 is a generally schematic illustration of a vehicle alarm unit for use in cooperation with the receiver retransmitter of FIG. 7.

The vehicle alarm unit, as shown in FIG. 8, is intended to be installed in any vehicle such that when the corresponding remote alarm initiator unit initiates an alarm to a fixed area alarm unit within range of the automobile, the fixed area alarm unit can signal the vehicle unit to signal, for example by flashing the exterior vehicle lights, until reset. The fixed area alarm unit can reset the vehicle alarm unit after a time delay, such as 15 minutes for example, which should be sufficient time for security or police to arrive on the scene.

The vehicle alarm unit includes features that prevent tampering or vandalism which would make the unit inoperable. Preferably, the vehicle alarm unit is mounted on an inside body surface such as the side sheet metal in the trunk area, the roof top, the trunk or hood top, or one of the body or door side panels. Elements of the unit extend through the body panel. The alarm components are mounted preferably within a tamper-proof enclosure having features to permit easy detection of tampering and/or other disturbance that might disable the functions of the unit. The antenna and exterior light thereof are part of the tamper-proof design, even though they may extend through the body panel of the vehicle.

The vehicle alarm has one electrical input that is energized from the vehicle ignition switch 144. This input will light a light 146 which can be readily seen from the outside of the vehicle. Light 146 is illuminated whenever the car is operating and is to be checked during vehicle inspections. If not illuminated, this would be cause for the vehicle to be stopped by police or security personnel. Preferably, protection circuitry is also provided to automatically disable light 146 if the alarm signaling device is inoperative. This precludes circumventing the auto alarm by tampering.

Input power from switch 144 also passes through a reverse circuit protection diode 148 and maintains the charge in an internal battery 150 during operation of the unit. Diode 148 prevents a backflow of energy, allowing battery 150 to remain charged even if the vehicle battery (not shown) should become discharged. Power for the operation of receiver and decoder units also comes from the vehicle ignition key switch 144, thereby making the system operational only when the vehicle is being operated. Power for electrical latching functions and alarms, (e.g. special lights or a siren) once they are activated, comes from internal battery 150 with assistance from the vehicle electrical system when ignition switch 144 is closed.

An actuating signal received by an antenna 152 is demodulated by a receiver 154. The demodulated signal is interpreted by decode modules 156 and 158. The alarm trigger decode module 156 compares the coded transmission to the code set in a code select module 160. If it is a valid alarm code, decode module 156 energizes a relay coil 162 to cause normally open contact 164 to close and supply the power to the vehicle horn or a siren 166, and through normally closed contacts 168 to a capacitor 170 and a parallel connected relay coil 172, thus charging the capacitator and energizing the relay coil 172. Power is also fed through normally closed key switch 174 and normally closed relay contacts 176 back to coil 162, thus latching contacts 164 closed until reset. As previously discussed an arrangement of alarm lights may be used in lieu of the siren or horn 166.

Relay coil 172, capacitor 170, and contacts 168 comprise a heavy duty flasher circuit that alternately opens and closes contacts 168. Ganged contacts 178 and 180 cycle open and closed during this flasher circuit operation in unison with contacts 168, and are connected as needed to intercept and/or supply power to selected exterior lighting systems such as head lights and parking lights.

When the alarm code ceases, the vehicle alarm unit will continue to sound its local alarms until relay coil 162 is de-energized. Key switch 174 allows manual reset of the unit as needed. Accordingly, key switch 174 preferably is located in an inconspicuous place and not readily accessible to an unauthorized person such as a car thief. Once the alarm code ceases, a reset signal may be transmitted by a nearby fixed area alarm unit to be received by antenna 152, demodulated by receiver 154, and interpreted by decoder unit 158. If the code received is the same as that preset in code selector module 182, decoder 158 will energize relay coil 184 to open contacts 176 and stop the flow of latching power to coil 162, thus resetting the alarm.

Once the vehicle alarm is initiated, the power input from the ignition switch is no longer necessary for operation, and if the switch is turned on or off this will not cause the unit to reset. The internal battery 150 can continue to sound the alarm for an appreciable period of time without external power.

According to the description hereinabove, there is provided by the instant invention a novel and improved alarm system for home, office, car, and personal use. The system relies on a network of fixed and remote alarm initiators, facility mounted alarm receivers, displays and retransmitters, and similar fixed area alarm receivers, displays and retransmitters. The system provides for initiation of local alarms and signaling of central security authorities from either remote or fixed initiators through use of a coding system in which distinct codes are established for individual homes or buildings, individual vehicles, individual remote alarm initiators, and individual area alarms such that transmission of the coded alarm signals will set off only the proper alarm units, and will also serve to identify the source of the alarm signal. In addition, an alarm initiator is described which includes a single use feature that prevents multiple uses of the initiator without intervening reset operations which preferably can be provided only by authorized security or service personnel.

Of course, I have contemplated various alternative and modified embodiments of the invention apart from those described hereinabove. For example, the lock mechanism on the remote initiators may be operative after a multiplicity of actuations of the push button rather than after a single operation, or a time delay may be utilized in lieu of a mechanical lock to preclude improper use of the remote initiator. These and other alternatives surely would also occur to others versed in the art, once apprised of my invention. Accordingly, it is intended that the invention be construed broadly and limited only by the scope properly attributable to the claims appended hereto.

I claim:

1. An alarm system comprising:

at least one portable initiator means which is operable to transmit a first coded signal;

said portable initiator means including manually operable actuator means which is operable to actuate said portable initiator means for transmitting said first coded signal;

at least one receiver/retransmitter means operable to be actuated by receiving such a first coded signal and in response to retransmit a second coded signal having a code different from said first coded signal;

receiver means operable to receive said second coded signal;

indicia means associated with said at least one receiver/retransmitter means and operable to provide a local alarm upon actuation of said at least one receiver/retransmitter means and;

said portable initiator means further including locking switch means which is operable to permit locked actuation of said actuator means to thereby limit said transmitting of said first coded signal, said portable initiator means being inoperable until reset by Authorized security personnel.

2. The alarm system as set forth in claim 1 wherein said locking switch means includes a mechanical lock means which is operative in response to a first given actuation of the respective said actuator means to preclude further actuation thereof.

3. The alarm system as set forth in claim 2 wherein said at least one portable initiator means includes electrically operative means which is operable to release said mechanical lock means to permit further actuation of said actuator means.

4. The alarm system as set forth in claim 3 wherein said at least one portable initiator means includes a plurality of initiators which are operable to transmit a respective plurality of said first coded signals which are mutually distinct one from another.

5. The alarm system as set forth in claim 4 wherein said at least one receiver/retransmitter means includes a plurality of receiver/transmitter units each of which is capable of receiving only the said first coded signal of a respective one of said plurality of initiators, each of said plurality of receiver/retransmitter means being operable upon actuation thereof by the respective one of said plurality of initiators to retransmit said second coded signal.

6. The alarm system as set forth in claim 5 additionally including at least one additional receiver/retransmitter means which is operable in response to receipt of said second coded signal to retransmit a third coded signal.

7. The alarm system as set forth in claim 6 wherein said plurality of receiver/retransmitter units and said additional receiver/retransmitter means all include indicia means for local indication of actuation thereof.

* * * * *

UNITED STATES PATENT AND TRADEMARK OFFICE

CERTIFICATE OF CORRECTION

PATENT NO. : 5,070,320

DATED : December 3, 1991

INVENTOR(S) : Ralph Romano

It is certified that error appears in the above-identified patent and that said Letters Patent is hereby corrected as shown below:

ON TITLE PAGE: Item [19]

should read "Romano".

Item [76] "Ralph Ramono" should read

--Ralph Romano--.

.Signed and Sealed this

Twenty-eighth Day of April, 1992

*Attest:*

HARRY F. MANBECK, JR.

*Attesting Officer*

*Commissioner of Patents and Trademarks*